United States Patent

Hsu et al.

[11] Patent Number: 6,088,906
[45] Date of Patent: Jul. 18, 2000

[54] METHOD OF MANUFACTURING SQUIRREL CAGE ROTORS

[75] Inventors: John S. Hsu, Oak Ridge; Edgard A. Franco-Ferreira, Knoxville, both of Tenn.

[73] Assignee: UT-Battelle, LLC, Oak Ridge, Tenn.

[21] Appl. No.: 08/931,462

[22] Filed: Sep. 16, 1997

[51] Int. Cl.$^7$ ................................... H02K 15/02
[52] U.S. Cl. ............................. 29/598; 310/211; 310/42
[58] Field of Search ................. 29/596, 598; 310/211, 310/212, 42

[56] References Cited

U.S. PATENT DOCUMENTS

| | | |
|---|---|---|
| 1,695,799 | 12/1928 | Daun . |
| 1,755,283 | 4/1930 | Adams . |
| 2,248,167 | 8/1941 | Elsey ................................... 29/155.53 |
| 3,705,971 | 12/1972 | Jacovides ............................... 219/121 |
| 4,249,098 | 2/1981 | Karlen ................................... 310/183 |
| 4,388,756 | 6/1983 | Burns ..................................... 29/598 |
| 4,970,424 | 11/1990 | Nakamura et al. . |
| 5,185,918 | 2/1993 | Shafer ..................................... 29/598 |
| 5,398,404 | 3/1995 | Meyer et al. . |
| 5,697,545 | 12/1997 | Jennings et al. . |
| 5,729,885 | 3/1998 | Carosa ..................................... 29/598 |
| 5,736,707 | 4/1998 | Nied et al. . |
| 5,795,118 | 8/1998 | Osada . |

*Primary Examiner*—Irene Cuda
*Assistant Examiner*—Steven A Blount
*Attorney, Agent, or Firm*—Quarles & Brady LLP

[57] ABSTRACT

A method of making a squirrel cage rotor of copper material for use in AC or DC motors, includes forming a core with longitudinal slots, inserting bars of conductive material in the slots, with ends extending out of opposite ends of the core, and joining the end rings to the bars, wherein the conductive material of either the end rings or the bars is copper. Various methods of joining the end rings to the bars are disclosed including friction welding, current pulse welding and brazing, transient liquid phase joining and casting. Pressure is also applied to the end rings to improve contact and reduce areas of small or uneven contact between the bar ends and the end rings. Rotors made with such methods are also disclosed.

5 Claims, 6 Drawing Sheets

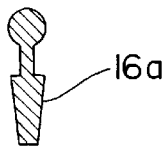 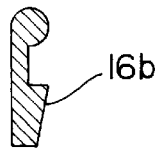 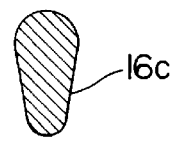 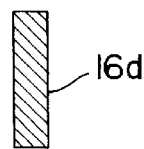
FIG. 3a     FIG. 3b     FIG. 3c     FIG. 3d
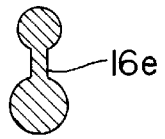 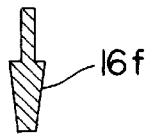 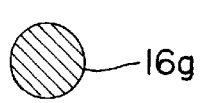
FIG. 3e     FIG. 3f     FIG. 3g
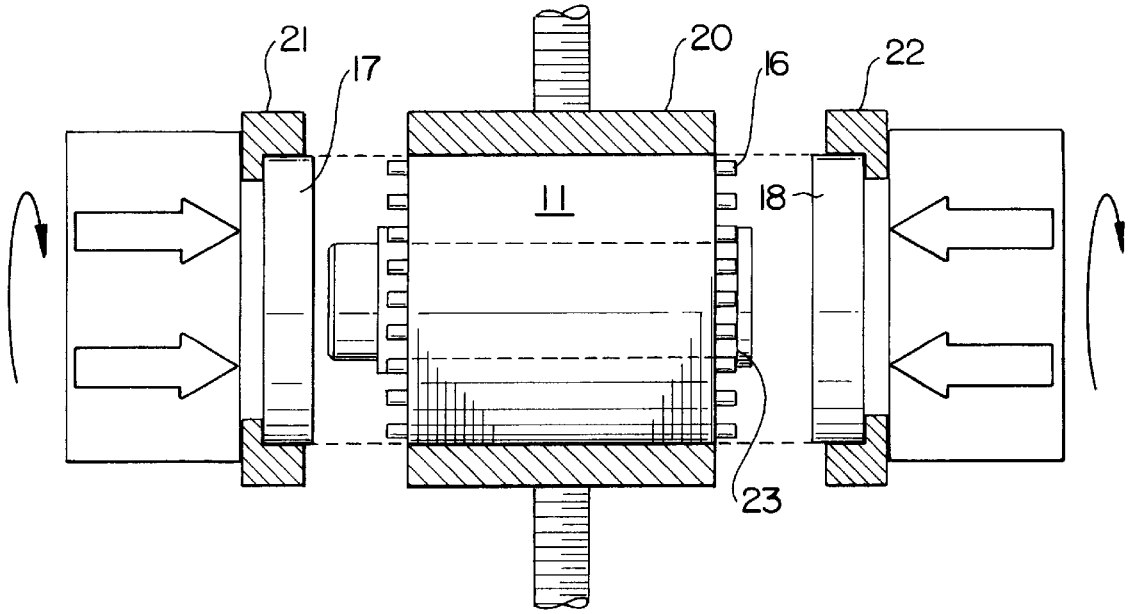
FIG. 4

METHOD OF MANUFACTURING SQUIRREL CAGE ROTORS

TECHNICAL FIELD

The present invention relates to electrical motors and methods for manufacture of rotors used in such motors.

DESCRIPTION OF THE BACKGROUND ART

Roughly two-thirds of the electricity generated for industry in the United States is used to power electric motors. Approximately one billion motors are in use in the United States. Electric motors are used for machine tools, pumps, fans, compressors and many other industrial, commercial and residential loads.

Many of these motors are small AC induction motors having die cast aluminum squirrel cage rotors. An operating characteristic of these motors, known as "slip," is generally proportional to the electrical resistance in the rotor. Lower resistance produces lower slip and greater efficiency at load-carrying operating points. The resistance of copper is lower than aluminum. The use of copper in such rotors can increase the efficiency of the motor by 2% of the total input energy. Current manufacturing methods using copper need improvement for success in manufacture of small horsepower motors. Currently, a silver-copper brazing technique is used for large horsepower motors, and this method is expensive and slow and not cost effective for smaller horsepower motors.

Another possible method for making a copper rotor is die casting, but copper die casting requires high operating temperatures, which are higher than those required for aluminum die casting. Furthermore, the dies for copper die casting do not have sufficient life for larger scale production. It is therefore, desirable to use preformed or extruded bars in the rotor, and to join these bars to end rings.

SUMMARY OF THE INVENTION

The invention relates to a rotor for an electrical machine and a method of manufacture using new metallurgical methods for joining metal bars and end rings in manufacturing the rotor. The invention also relates to increasing the copper in such rotors by providing the improved methods for joining copper materials to other copper materials or to aluminum materials. Although the invention finds application in AC induction motors, it can also be applied to other types of electrical machines including, but not limited to, homopolar DC motors.

The method of the invention includes the steps of inserting conductors of conductive material in respective slots of a core with slots running longitudinally therein, the conductors extending longitudinally through the core and the conductors having ends extending out of opposite ends of said core, pressing end rings of conductive material into contact with the ends of the conductors on opposite ends of the core, and joining the end rings to the conductors, wherein the conductive material of either the end rings or the conductors, or both, is copper.

The methods of the invention include friction welding, pulsed current welding and brazing, transient liquid phase joining and casting. Pressure is also applied to the end rings to improve contact and reduce areas of small or uneven contact between the bar ends and the end rings.

The invention also relates to rotors made according to the above methods.

These and other objects of the present invention will become readily apparent upon further review of the following specification and the drawings which are incorporated herein and which describe and illustrate several preferred embodiments of the invention. Such embodiments are not, however, exhaustive of all possible embodiments, and therefore reference should be made to the claims which follow the description for the legal scope of the invention.

BRIEF DESCRIPTION OF THE DRAWINGS

FIGS. 3a–3g are detail sectional views of bars for use in the embodiment in FIGS. 1 and 2;

FIG. 4 is an elevational view of a friction welding method of making the rotor of FIGS. 1 and 2;

DETAILED DESCRIPTION OF THE PREFERRED EMBODIMENTS

Figure 1:
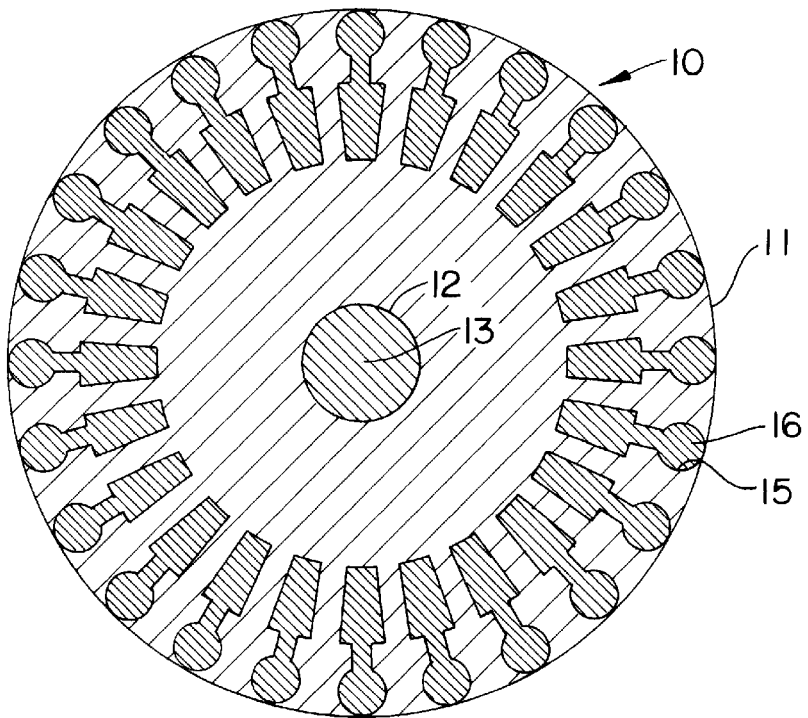
FIG. 1 is a transverse sectional view of a first embodiment of the invention taken in the plane indicated by line 1—1 in FIG. 2.
Figure 2:
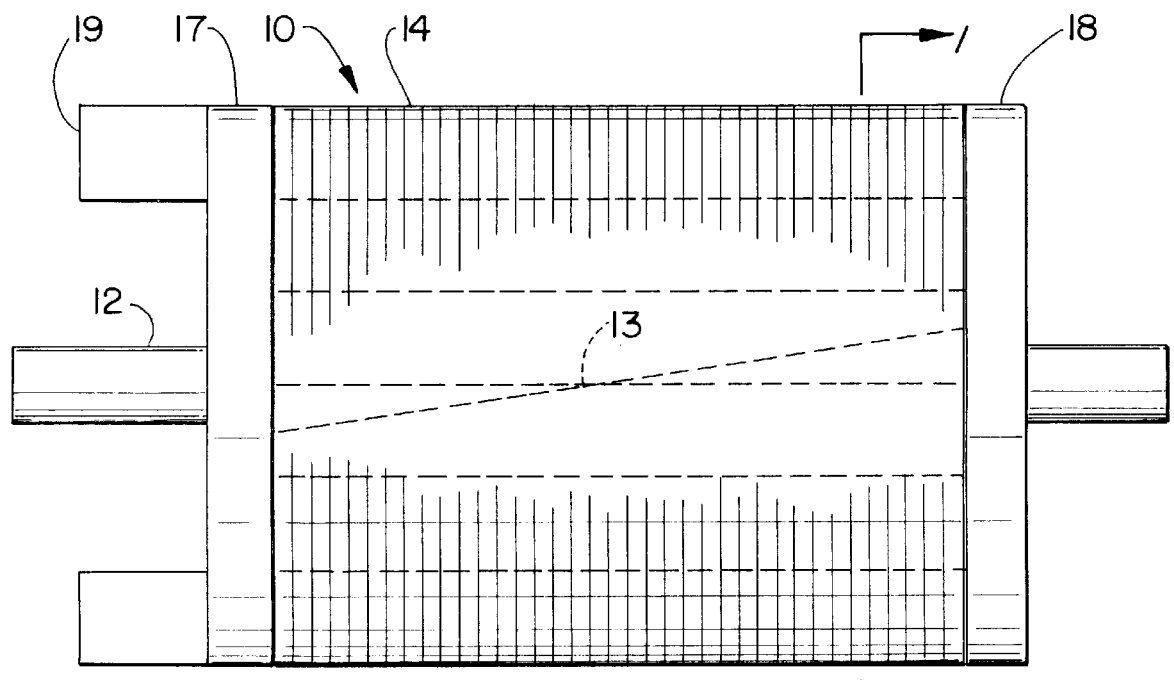
FIG. 2 is a longitudinal view in elevation of a rotor made according to the present invention.

FIGS. 1 and 2 show a squirrel cage rotor 10 with a cylindrical core 11 and a rotor shaft 12 extending along a central axis 13 of the core 11 for rotation of the rotor 10 around the axis. The core 11 is formed of a plurality of stacked metal sheets 14 shown in FIG. 2 which are insulated from each other and clamped together to form the laminated core 11 seen in FIG. 2. The core 11 has slots 15 running longitudinally and opening to its outer perimeter. Inside the slots 15 are bars or conductors 16, which are solid metal elongated members which can be made of aluminum or copper, and which are preferably made of a copper material for the present invention, due to the higher conductivity and lower resistance of copper in comparison with aluminum. The copper material may be pure copper or an alloy of copper and other materials. The bars 16 are preferably preformed and inserted into the slots 15 as opposed to being cast within the slots 15.

At opposite ends of the rotor 10 are end rings, 17, 18, with end ring 18 having blades 19 for ventilating the motor. The end rings 17, 18 are also preferably made of a copper material, but could be made of an aluminum material in combination with copper bars 15. Conversely, the invention also contemplates an embodiment with bars of aluminum material and end rings of a copper material, with the object being to increase the use of multiple stack rotors in various kinds of AC and DC motors. It should be understood that aluminum material refers to a material of pure aluminum or an alloy including aluminum.

The configuration of the bars or conductors 16a–16g, when viewed in cross section, may take many shapes and still come within the scope of the invention. FIGS. 3a–3g show just some of the shapes which the bars 16a–16g can take, including a keyhole shape in FIGS. 3a, 3b, 3e and 3f for double cage rotors, a rectangular shape in FIG. 3d for deep bar rotors, and a circular shape in FIG. 3g for single cage rotors. The selection of the best shape for a particular motor is based on the motor specifications including starting torque, pull-up torque, break-down torque, starting current and other parameters.

FIG. 4 shows a rotor 10 made with extruded or preformed copper or aluminum bars 16 and either aluminum or copper end rings 17, 18. The core 11 is formed of laminations which are held together by an arbor 23 as the bars 16 are inserted in the slots, with ends extending a short distance outside the core 11 on either end. The core 11 is clamped by a fixture 20. The end rings are first rotated around their rotational axes (represented by the arcuate arrows) at a suitable high speed. The rotating end rings 17, 18 are then simultaneously pushed into contact with the ends of the bars (as represented by the horizontal arrows). In one type of welding process, the mandrels 21, 22 carrying the end rings are braked to a stop. The resultant frictional heating causes the ends of the bars and the contacting surfaces of the rings to fuse into a metallurgical joint. In another type of welding, a large inertial mass is rotated with the mandrels 21, 22 and end rings 17, 18. These decelerate after being pushed against the ends of the bars 16 until the occurrence of the weld itself stops the end rings 17, 18 from rotating further. It is also possible to apply a higher axial pressure and high axial current to the end rings 17, 18 using the methods of FIGS. 6 and 7 to fuse the end rings 17, 18 to the bars. The current is then reduced, with mechanical pressure maintained during a cool-down step.

Figure 5:
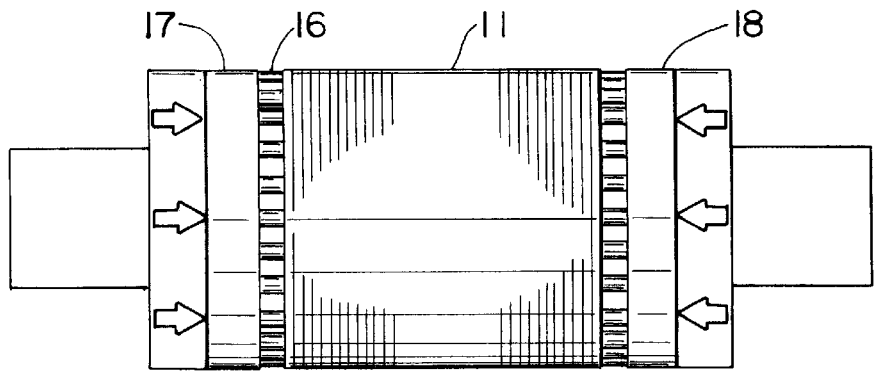
FIG. 5 is an elevational view of one step in the methods of making the rotor of FIGS. 1 and 2 according to the present invention.
Figure 8A:
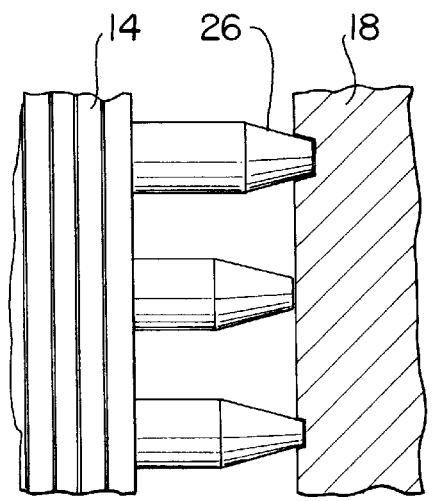
FIGS. 8a, 8b, 9a and 9b are detail views of end joints assembled according to the method of FIG. 6.
Figure 8B:
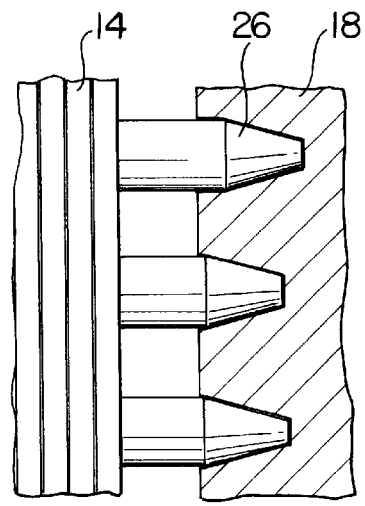
Figure 9A:
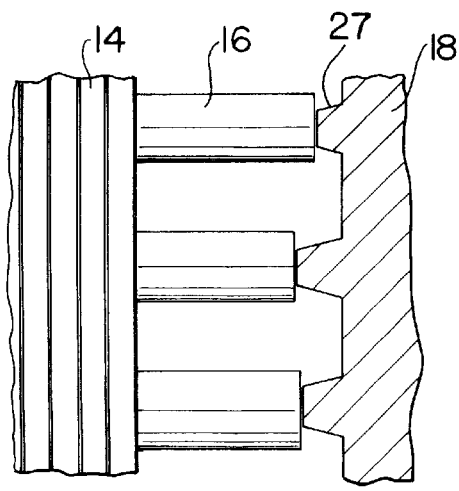
Figure 9B:
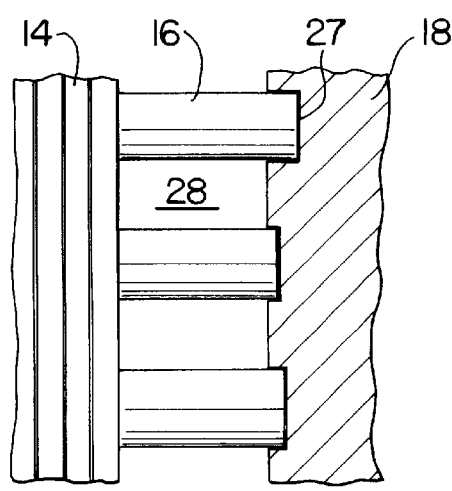

FIGS. 5, 8a, 8b, 9a and 9b show a step for overcoming the problem of non-touching between the bars 16 and the end rings 16, 17 at areas of reduced cross section contact between the bars 16 and the end rings 17, 18. Interfacing gaps can be eliminated by applying pressure to the end rings 17, 18 as shown in FIG. 5, with the results shown in FIGS. 8b and 9b from two respective starting positions shown in FIGS. 8a and 9a, respectively. In FIG. 8b the tapered ends 26 of the bars 16 provide higher initial resistance for heat generation at the joints. The tapered ends become embedded in the end ring 18. In FIG. 9b, the projections 27 on the end ring 18 have become flattened and material of the end ring 18 projects into the gaps 28 between ends of the bars 16. These steps eliminate areas of reduced cross section, which are areas of higher resistance.

Figure 6:
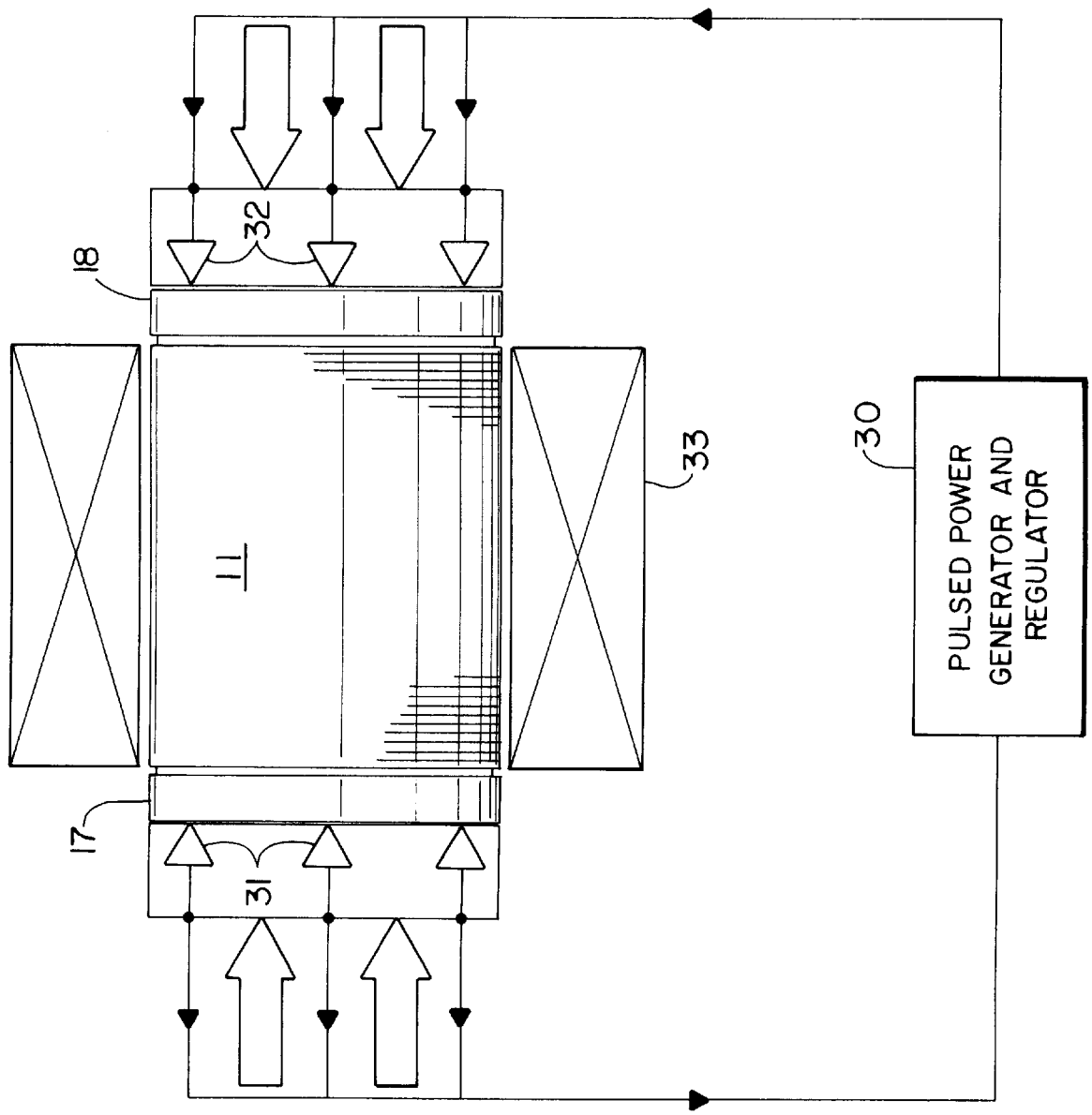
FIG. 6 is a schematic view of a pulse welding method of making the rotor of FIGS. 1 and 2.
Figure 7:
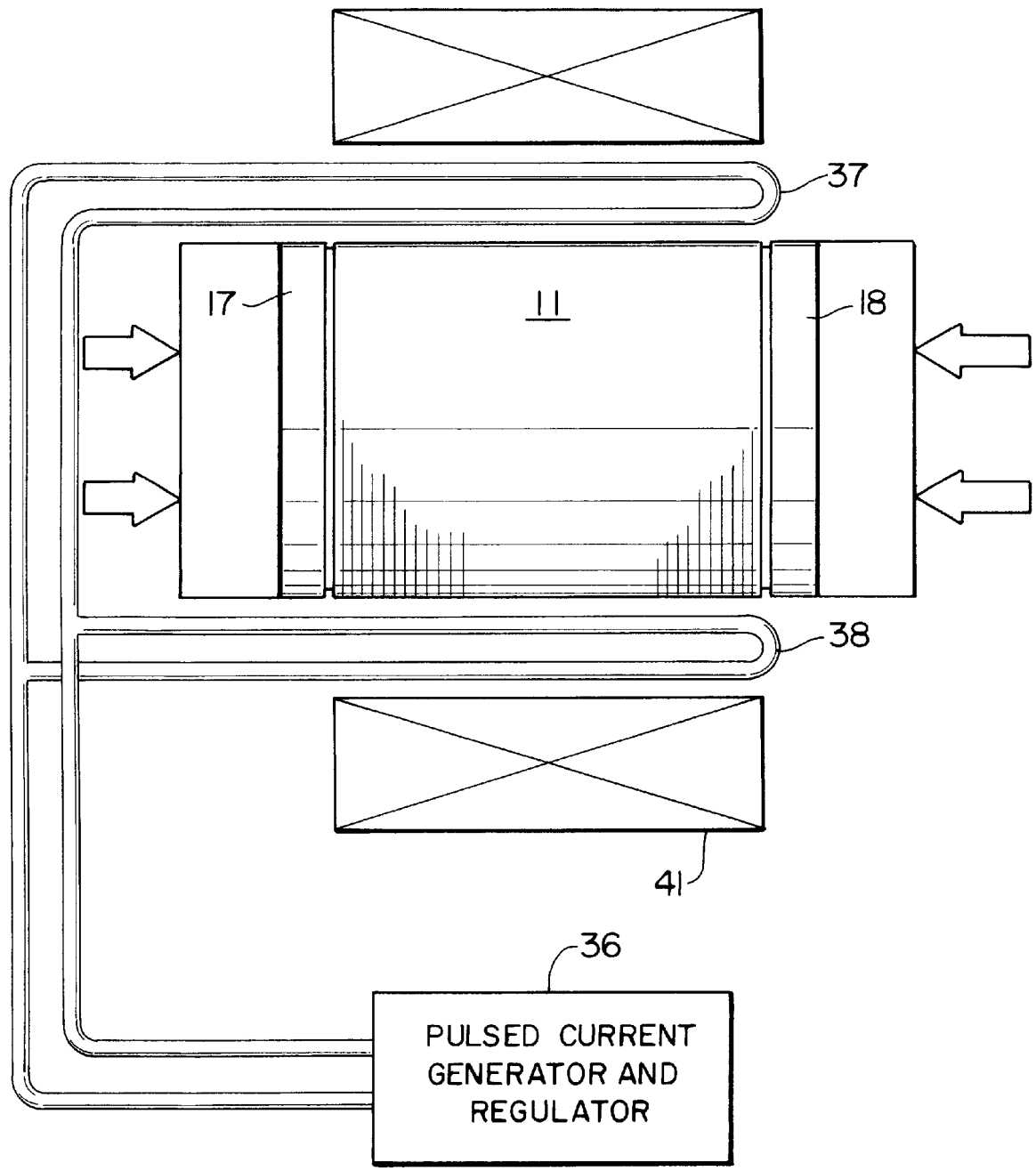
FIG. 7 is a schematic view of an alternative pulse welding method of making the rotor of FIGS. 1 and 2.
Figure 10:
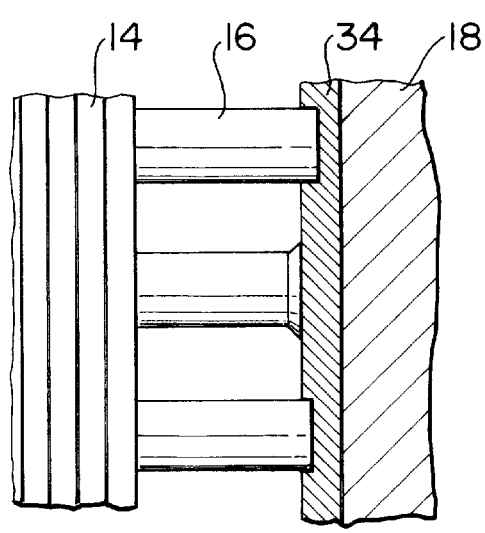
FIGS. 10 and 11 are detail views of end joints assembled according to the methods of FIGS. 5, 6 and 7.

FIGS. 6 and 7 show two arrangements for welding the end rings 17, 18 to the rotor conductor bars 16. FIG. 6 illustrates an arrangement with a pulse generator 30 and electrodes 31, 32 for passing a large power pulse through the end rings 17, 18 to weld the rings 17, 18 to the bars 16. The electrodes 31, 32 contact the end rings 17, 18 on opposite ends, are evenly distributed across the face of the end rings 17, 18 with stacking pressure being applied, and may be water-cooled. It is also possible to use a magnetic chamber, represented by magnet coil 33, to introduce additional leakage reactance into bars 16. This equalizes currents in the individual joints between rings 17, 18 and bars 16.

FIG. 7 shows an arrangement for welding in which a pulsed current generator 36 connects to two current windings 37, 38 which act as a primary winding and induce a current in the rotor bars (not shown) and end rings 17, 18 which act as a secondary winding. A magnetic coil 41 is used to provide a return path for flux in the rotor 10.

Figure 11:
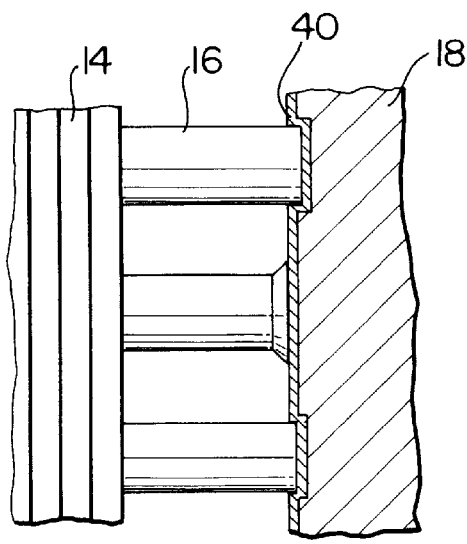

As seen in FIG. 11, a foil of a brazing alloy 34 such as silver solder or nickel-based alloy can be placed between the ends of the bars 16 and the end rings 17, 18. When a pulse is passed through the end rings 17, 18 using the method of FIGS. 6 or 7, the joints are heated and the bars 16 effectively joined by a braze joint 34 to the end rings 17, 18. The rings 17, 18 can be pressed against the ends of the bars 16 (FIG. 5) with the effect of deforming either the ends of the bars 16 or the end rings 17, 18 and improving the joint between them.

Referring to FIG. 11, it is also possible to form joints using eutectics which exhibit a transient liquid phase when in contact with copper at elevated temperature. These materials include manganese (having a eutectic melting point of 868° C.) silicon (having a eutectic melting point of 802° C.) and silver (having a eutectic melting point of 780° C.). A very thin coating 40 in the range of 0.00025 in.–0.0005 in. is applied to the surface of the joint by electroplating or physical vapor deposition. The rings 17, 18 are then clamped against the ends of the bars 16 and joints are heated to slightly above the eutectic temperature. The resulting liquid phase would wet the ends of the bars 16, and surfaces of the end rings and form a joint as shown in FIG. 11 (where the thickness of joint 40 has been exaggerated). Heating can be accomplished by one of the pulsed current methods of FIGS. 6 or 7, or in a furnace.

The eutectic process could also be performed with aluminum bars or aluminum end rings joined to copper. Three materials that form eutectics with aluminum are silicon (having a eutectic melting point of 577° C.), copper (having a eutectic melting point of 548° C.) and germanium (having a eutectic melting point of 420° C.). The eutectic-forming material is applied by vacuum sputtering to avoid forming a layer of aluminum oxide on the aluminum parts. Heating can be carried out by resistance heating or in a vacuum furnace.

Figure 12:
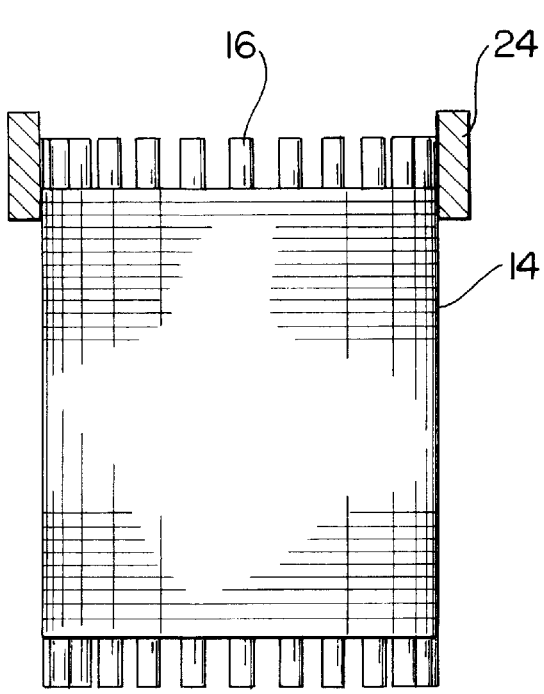
FIGS. 12 and 13 are elevational views of another method of making the rotor of FIGS. 1 and 2 according to the present invention.
Figure 13:
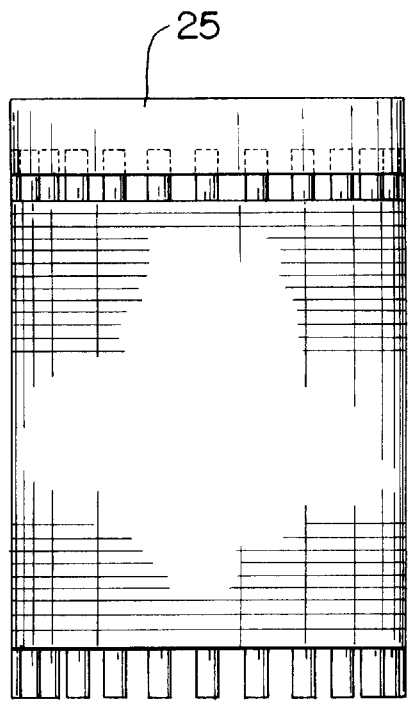

Referring next to FIGS. 12 and 13, another method of joining end rings 17, 18 to the bars 15 is as follows. The stacked core laminations 14 are held vertically with the preformed copper bars 16 again extending out of opposite ends. A mold 24 is placed around the upper end, and molten metal, preferably aluminum, is poured into the mold and allowed to solidify in the form of an aluminum casting 25.

This has been a description of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

We claim:

1. A method of making a rotor for an electrical machine, the method comprising the steps of:

inserting conductors of conductive material in respective slots of a core with slots running longitudinally therein, the conductors extending longitudinally through the core and the conductors having ends extending out of an end of said core forming a discontinuous conductive surface at said core end;

pressing a continuous surface of an end ring of conductive material into contact with said discontinuous conductive surface; and joining said continuous surface of said end ring to the discontinuous conductive surface, wherein the conductive material of either the end ring or the conductors is aluminum or aluminum alloy; and wherein the joining step includes applying torque to one of said surfaces in a rotational direction to create friction.

2. The method of claim 1, wherein the end rings are made of an aluminum material and the conductors are made of a copper material.

3. The method of claim 1, wherein the end rings are made of a copper material and the conductors are made of an aluminum material.

4. The method of claim 1, in which the conductor ends are tapered.

5. The method of claim 1, in which a projection extends axially from said end ring continuous surface, wherein the pressing step includes pressing said projection into contact with said discontinuous surface, and the joining step further includes deforming said projection.

\* \* \* \* \*